(12) United States Patent
Sato et al.

(10) Patent No.: US 12,542,326 B2
(45) Date of Patent: Feb. 3, 2026

(54) ELECTRIC POWER STORAGE MODULE

(71) Applicant: Panasonic Intellectual Property Management Co., Ltd., Osaka (JP)

(72) Inventors: Kasumi Sato, Osaka (JP); Shota Norimine, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 577 days.

(21) Appl. No.: 17/999,066

(22) PCT Filed: May 21, 2021

(86) PCT No.: PCT/JP2021/019292
§ 371 (c)(1),
(2) Date: Nov. 17, 2022

(87) PCT Pub. No.: WO2021/241419
PCT Pub. Date: Dec. 2, 2021

(65) Prior Publication Data
US 2023/0187758 A1 Jun. 15, 2023

(30) Foreign Application Priority Data
May 29, 2020 (JP) .................................. 2020-094138

(51) Int. Cl.
*H01M 50/262* (2021.01)
*H01G 11/10* (2013.01)
(Continued)

(52) U.S. Cl.
CPC ....... *H01M 50/262* (2021.01); *H01M 50/209* (2021.01); *H01G 11/10* (2013.01); *H01G 11/82* (2013.01)

(58) Field of Classification Search
None
See application file for complete search history.

(56) References Cited

U.S. PATENT DOCUMENTS

| | | | |
|---|---|---|---|
| 11,374,288 B2* | 6/2022 | Omura | H01M 50/507 |
| 11,380,948 B2* | 7/2022 | Shimizu | H01M 10/6567 |

(Continued)

FOREIGN PATENT DOCUMENTS

| | | |
|---|---|---|
| DE | 102014217160 A1 | 3/2016 |
| JP | 2016-091871 | 5/2016 |
| JP | 2019-169270 | 10/2019 |

OTHER PUBLICATIONS

International Search Report of PCT application No. PCT/JP2021/019292 dated Aug. 3, 2021.

(Continued)

*Primary Examiner* — Kevin M Bernatz
(74) *Attorney, Agent, or Firm* — Rimon P.C.

(57) ABSTRACT

An electric power storage module includes an array body in which a plurality of electric power storage devices are arranged in a first direction, a pair of end plates which are disposed at both ends of the array body to interpose the array body, and a first binding member and a second binding member which bind the array body in the first direction. The first binding member includes a first main body extending in the first direction and a pair of first protrusions protruding from both ends of the first main body toward the end plates and fixed to each end plate. The second binding member includes a second main body extending in the first direction and a pair of second protrusions protruding from both ends of the second main body toward the end plates and fixed to each end plate. At least a portion of the first protrusion and at least a portion of the second protrusion overlap each other in the first direction to form an overlapping section.

12 Claims, 9 Drawing Sheets

(51) Int. Cl.
*H01G 11/82* (2013.01)
*H01M 50/209* (2021.01)

(56) References Cited

U.S. PATENT DOCUMENTS

| | | | |
|---|---|---|---|
| 11,660,951 B2* | 5/2023 | Ishibashi | H01M 10/0486 |
| | | | 429/149 |
| 12,355,046 B2* | 7/2025 | Yamashiro | H01M 50/204 |
| 2006/0093890 A1* | 5/2006 | Steinbroner | H01M 8/248 |
| | | | 429/511 |
| 2020/0251699 A1* | 8/2020 | Omura | H01M 10/0481 |
| 2022/0006138 A1* | 1/2022 | Norimine | H01M 50/289 |
| 2023/0052085 A1* | 2/2023 | Sato | H01G 11/12 |

OTHER PUBLICATIONS

The EPC Office Action dated Oct. 11, 2023 for the related European Patent Application No. 21814545.6.

* cited by examiner

ELECTRIC POWER STORAGE MODULE

CROSS-REFERENCE TO RELATED APPLICATIONS

This application is a U.S. national stage application of the PCT International Application No. PCT/JP2021/019292 filed on May 21, 2021, which claims the benefit of foreign priority of Japanese patent application No. 2020-094138 filed on May 29, 2020, the contents all of which are incorporated herein by reference.

TECHNICAL FIELD

The present disclosure relates to an electric power storage module.

BACKGROUND ART

As a power source required to have a high output voltage for a vehicle or the like, there has been known an electric power storage module in which a plurality of electric power storage devices (e.g., batteries) are connected in series. In general, an electric power storage module includes: a plurality of electric power storage devices; a pair of end plates arranged at both ends of the electric power storage devices in an array direction thereof; and a binding member (bind bar) that bridges over the pair of end plates to bind the plurality of batteries in the array direction (e.g., refer to PTL 1).

CITATION LIST

Patent Literature

PTL 1: Unexamined Japanese Patent Publication No. 2019-169270

SUMMARY OF THE INVENTION

Technical Problem

In general, an electric power storage device expands due to various factors. In a conventional electric power storage module, expansion of electric power storage devices is suppressed by end plates and binding members. However, due to the capacity of electric power storage devices increasing in recent years, the amount of expansion of the electric power storage devices tends to increase. When the amount of expansion of an electric power storage device increases, load applied to the binding structure of the electric power storage device also increases.

The present disclosure has been made in view of such a situation, and one object of the present disclosure is to provide a technique for strengthening the binding structure of the electric power storage device.

Solution to Problem

An aspect of the present disclosure is an electric power storage module. This electric power storage module includes an array body in which a plurality of electric power storage devices are arranged in a first direction, a pair of end plates which are disposed at both ends of the array body in the first direction to interpose the array body, and a first binding member and a second binding member which bind the array body in the first direction. The first binding member includes a first main body extending in the first direction and a pair of first protrusions protruding from both ends of the first main body in the first direction toward the end plates and fixed to each end plate. The second binding member includes a second main body extending in the first direction and a pair of second protrusions protruding from both ends of the second main body in the first direction toward the end plates and fixed to each end plate. At least a portion of the first protrusion and at least a portion of the second protrusion overlap each other in the first direction to form an overlapping section.

Any combination of the above constituent elements and modifications of what is described in the present disclosure in terms of method, device, system, and the like are also effective as aspects of the present disclosure.

Advantageous Effect of Invention

According to the present disclosure, the strength of the binding structure of an electric power storage device can be increased.

DESCRIPTION OF EMBODIMENT

Figure 1:
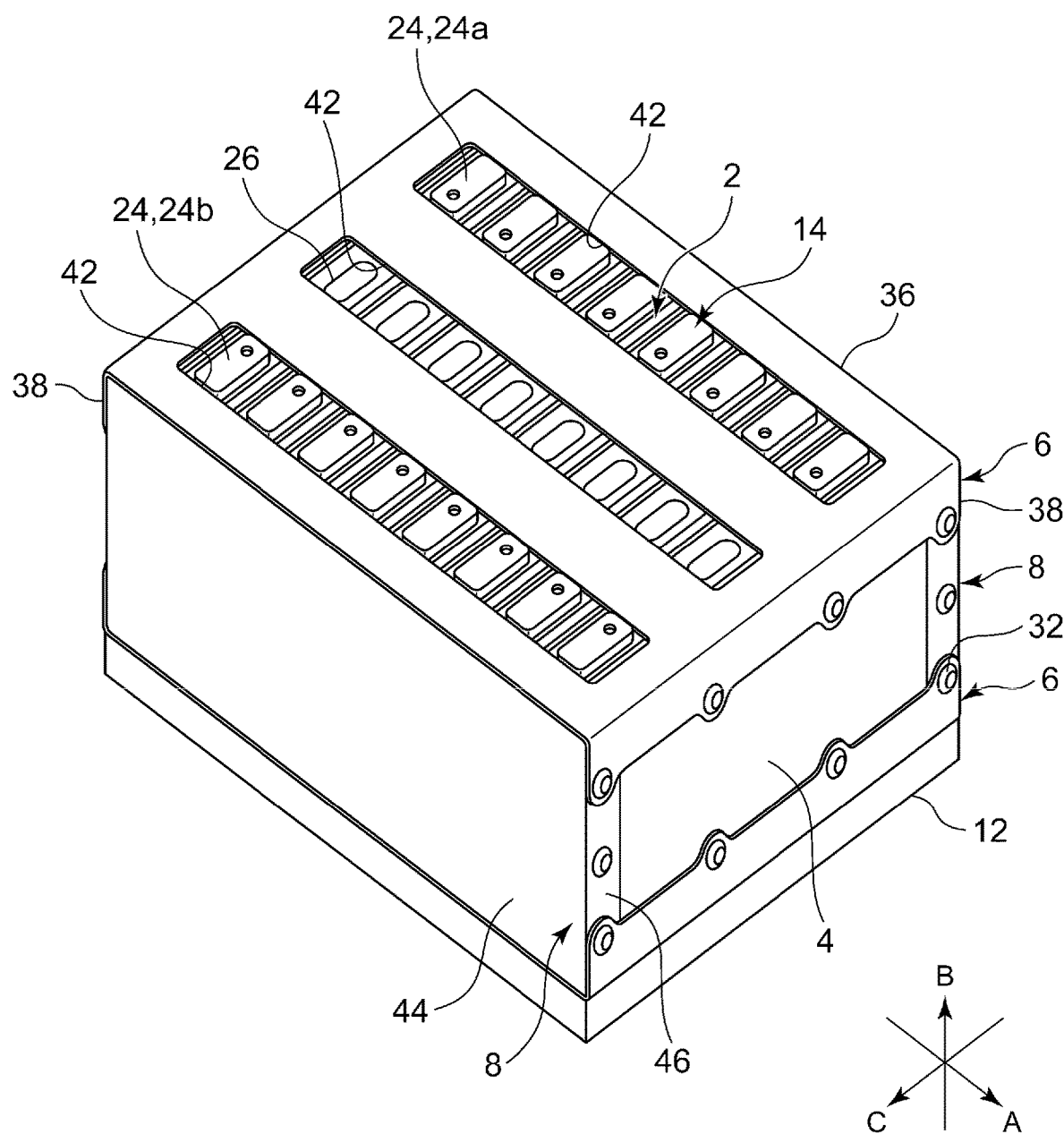
FIG. 1 is a perspective view of an electric power storage module according to a first exemplary embodiment.

The present disclosure will hereinafter be described on the basis of preferred exemplary embodiments, with reference to the drawings. The exemplary embodiments are not intended to limit the present disclosure but are illustrative, and all features described in the exemplary embodiments and combinations of the features are not necessarily essential to the present disclosure. The identical or equivalent constituent elements, members, and processing illustrated in the drawings are denoted by the identical reference marks, and repetitious description will be omitted when appropriate. The scale and the shape of each section illustrated in each drawing are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, a portion of members not important for describing the exemplary embodiments are omitted.

First Exemplary Embodiment

Figure 2:
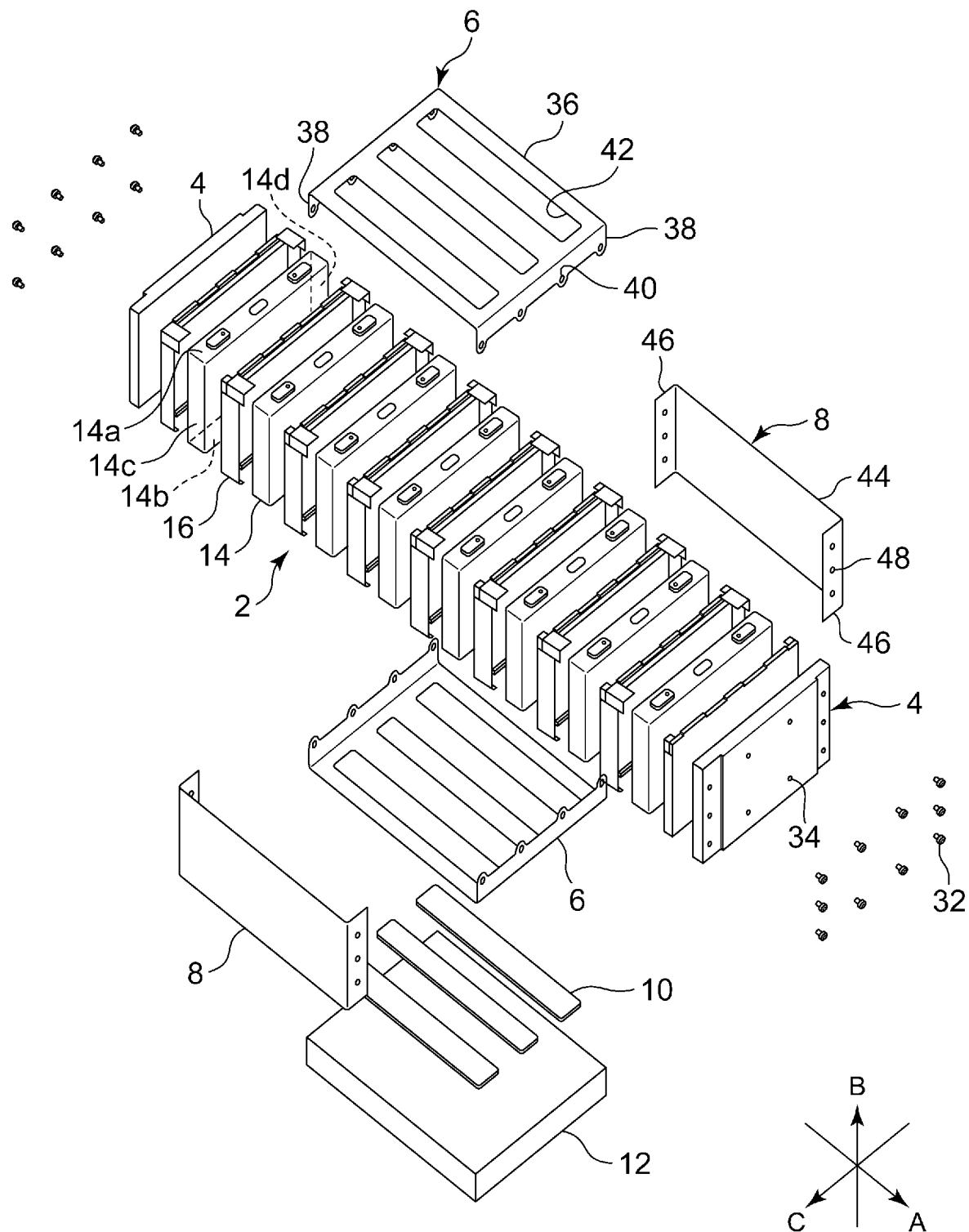
FIG. 2 is an exploded perspective view of the electric power storage module.
Figure 3:
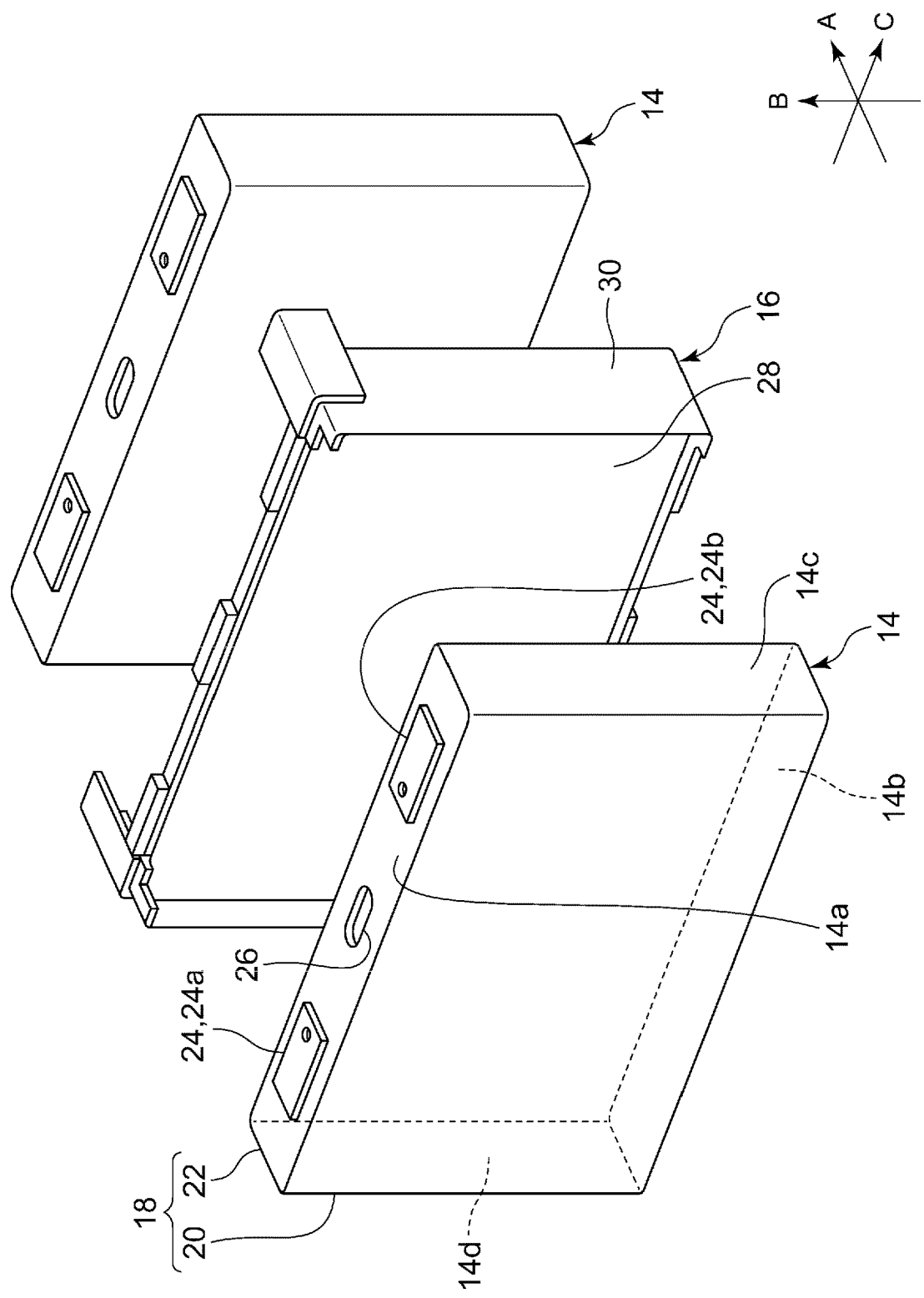
FIG. 3 is a perspective view of electric power storage devices and a separator.

FIG. 1 is a perspective view of electric power storage module 1 according to a first exemplary embodiment. FIG. 2 is an exploded perspective view of electric power storage module 1. FIG. 3 is a perspective view of electric power storage devices 14 and separator 16. Electric power storage module 1 includes array body 2, a pair of end plates 4, a pair of first binding members 6, a pair of second binding members 8, heat conducting members 10, and cooling plate 12.

Array body 2 includes a plurality of electric power storage devices 14 and a plurality of separators 16. Each electric power storage device 14 is, for example, a rechargeable secondary battery such as a lithium ion battery, a nickel-hydrogen battery, or a nickel-cadmium battery, or a capacitor such as an electric double layer capacitor. Electric power storage device 14 of the present exemplary embodiment is a so-called prismatic battery, and has housing 18 having a flat rectangular-parallelepiped shape. Housing 18 includes exterior can 20 and sealing plate 22.

Exterior can 20 has a substantially rectangular opening on one surface, and through this opening, an electrode assembly, an electrolyte, and the like are accommodated in exterior can 20. Exterior can 20 has a bottom surface opposing the opening, and four side surfaces connecting the opening to the bottom surface. Two out of the four side surfaces are a pair of long side surfaces, which are connected to two opposing long sides of the opening. Each of the long side surfaces is a main surface having the largest area among the surfaces of exterior can 20, that is, a main surface. The remaining two side surfaces other than the two long side surfaces are a pair of short side surfaces connected to short sides of the opening of exterior can 20.

Exterior can 20 may be covered with an unillustrated insulating film such as a shrink tube. With an insulating film covering a surface of exterior can 20, short-circuiting between adjacent electric power storage devices 14 can be suppressed. Short-circuiting between electric power storage device 14 and end plate 4 and between first binding member 6 and second binding member 8 can also be suppressed. Sealing plate 22 that seals exterior can 20 by closing the opening is fit in the opening of exterior can 20. Exterior can 20 and sealing plate 22 are conductors, and are made of metal such as aluminum, iron, or stainless steel, for example. Exterior can 20 and sealing plate 22 are joined together by laser welding, friction stir bonding, brazing, and the like. Alternatively, exterior can 20 and sealing plate 22 are made of a resin having an insulating property.

A pair of output terminals 24 are arranged in sealing plate 22. Specifically, positive electrode terminal 24a is provided near one end of sealing plate 22 in a longitudinal direction and negative electrode terminal 24b is provided near the other end. In the following, in a case where it is unnecessary to distinguish polarities of the pair of output terminals 24 from each other, positive electrode terminal 24a and negative electrode terminal 24b are collectively referred to as output terminals 24.

Each electric power storage device 14 has mutually opposite first surface 14a and second surface 14b, and mutually opposite third surface 14c and fourth surface 14d connecting first surface 14a to second surface 14b. In the present exemplary embodiment, sealing plate 22 constitutes first surface 14a, and the bottom surface of exterior can 20 constitutes second surface 14b. The pair of short side surfaces of exterior can 20 constitute third surface 14c and fourth surface 14d. The pair of long side surfaces of exterior can 20 constitutes the long side surfaces of electric power storage device 14. Electric power storage devices 14 are arranged such that first surfaces 14a face the same direction and third surfaces 14c face the same direction. Therefore, second surfaces 14b also face the same direction and fourth surfaces 14d also face the same direction.

In the description of the present exemplary embodiment, for the sake of convenience, a first surface 14a side of electric power storage device 14 is defined as an upper side in a vertical direction, and a second surface 14b side of electric power storage device 14 is defined as a lower side in the vertical direction. In array body 2, a surface on the first surface 14a side of electric power storage device 14 is defined as an upper surface of array body 2, a surface on the second surface 14b side of electric power storage device 14 is defined as a lower surface of array body 2, and surfaces on a third surface 14c side and a fourth surface 14d side of electric power storage device 14 are defined as side surfaces of array body 2. The pair of output terminals 24 may not be arranged on first surface 14a. For example, the pair of output terminals 24 may be arranged on third surface 14c. The two output terminals 24 may be provided on mutually different surfaces among first surface 14a to fourth surface 14d.

These directions and positions are defined for the sake of convenience. Therefore, for example, a portion defined as the upper surface in the present disclosure does not mean being always positioned above a portion defined as the lower surface. Therefore, first surface 14a is not necessarily positioned above second surface 14b. Hereinafter, a direction in which the plurality of electric power storage devices 14 are arranged (stacked) is referred to as first direction A, a direction in which first surface 14a and second surface 14b are arranged is referred to as second direction B, and a direction in which third surface 14c and fourth surface 14d are arranged is referred to as third direction C. First direction A, second direction B, and third direction C are directions orthogonal to each other. As an example, all of first surface 14a to fourth surface 14d extends parallel to first direction A.

Electric power storage device 14 has valve 26 on first surface 14a. Valve 26 may be omitted. Valve 26 is arranged between the pair of output terminals 24. Valve 26 is configured to be capable of being opened to release an internal gas of housing 18 when an internal pressure of housing 18 rises to a predetermined value or more. For example, valve 26 is formed of a thin part having a thickness smaller than a thickness of another part provided in a part of sealing plate 22, and a linear groove formed on a surface of this thin part. In this configuration, when the internal pressure of housing 18 rises, valve 26 is opened by tearing the thin part starting from the groove.

The plurality of electric power storage devices 14 are arranged at predetermined intervals in first direction A such that the long side surfaces of adjacent electric power storage devices 14 oppose each other. Two adjacent electric power storage devices 14 are arranged such that positive electrode terminal 24a of one electric power storage device 14 is adjacent to negative electrode terminal 24b of the other electric power storage device 14. Positive electrode terminal 24a and negative electrode terminal 24b are connected in series via a bus bar (not illustrated). Alternatively, output terminals 24 of a plurality of electric power storage devices 14 having the same polarity adjacent to each other may be connected in parallel by bus bars to form electric power storage device blocks, and these electric power storage device blocks may be connected in series.

Separator 16, which is also referred to as an insulating spacer, is arranged between the opposing long side surfaces of two adjacent electric power storage devices 14 to electrically insulate two electric power storage devices 14 from each other. Separator 16 is made of, for example, a resin with insulating property. The resin constituting separator 16 is, for example, a thermoplastic resin such as polypropylene (PP), polybutylene terephthalate (PBT), polycarbonate (PC), or Noryl (registered trademark) resin (modified PPE). The plurality of electric power storage devices 14 and the plurality of separators 16 are stacked alternately. Separators 16 are also arranged between electric power storage devices 14 and each end plate 4. This insulates electric power storage devices 14 and each end plate 4 from each other.

Each separator 16 has main body 28 and wall 30. Main body 28 has a flat plate shape and is interposed between the long side surfaces of two adjacent electric power storage devices 14. Wall 30 extends in first direction A from two side edges arranged in third direction C of main body 28 and mainly covers third surface 14c and fourth surface 14d of electric power storage device 14. In the present exemplary embodiment, main body 28 and wall 30 are integrally molded.

The pair of end plates 4 are arranged at both ends of array body 2 in first direction A. Array body 2 obtained by alternately arranging a plurality of electric power storage devices 14 and a plurality of separators 16 is interposed between the pair of end plates 4 in first direction A. Each end plate 4 is made of a metal plate or a resin plate, for example, and has a rectangular shape when viewed in first direction A. Examples of the metal used for each end plate 4 include aluminum, an aluminum alloy, and steel. Examples of the resin used for each end plate 4 include fiber-reinforced plastic (FRP). Fiber-reinforced plastics include carbon fiber-reinforced plastics and glass fiber-reinforced plastics. Each end plate 4 is provided with screw holes 34 into which screws 32 as fastening members are screwed. A structure of end plate 4 will be described in detail later.

A pair of first binding members 6 and a pair of second binding members 8 are also called binding bars. Each first binding member 6 and each second binding member 8 extends in first direction A and binds array body 2 in first direction A. One of the pair of first binding members 6 opposes first surface 14a of each electric power storage device 14, and the other opposes second surface 14b of each electric power storage device 14. That is, the pair of first binding members 6 opposes each other in second direction B with array body 2 interposed therebetween. One of the pair of second binding members 8 opposes third surface 14c of each electric power storage device 14, and the other opposes fourth surface 14d of each electric power storage device 14. That is, the pair of second binding members 8 opposes each other in third direction C with array body 2 interposed therebetween.

Each first binding member 6 includes first main body 36 and a pair of first protrusions 38. First main body 36 is a rectangular plate-shaped body extending in first direction A. First main body 36 extends in parallel to first surface 14a or second surface 14b of each electric power storage device 14. When viewed in second direction B, the outline of first main body 36 is substantially the same as the outline of the assembly including array body 2 and the pair of end plates 4. The pair of first protrusions 38 protrudes from both ends of first main body 36 in first direction A toward end plate 4, in other words, toward the opposing first binding member 6, and overlaps each end plate 4 in first direction A. The pair of first protrusions 38 opposes each other in first direction A with array body 2 interposed therebetween. Each first protrusion 38 has through holes 40 through which screws 32 are inserted.

The pair of first binding members 6 has holes 42. For example, holes 42 are configured as through holes penetrating first main body 36 in second direction B. Holes 42 may be configured as recesses recessed in second direction B. Each first binding member 6 includes holes 42, and thus, a weight of each first binding member 6 can be reduced. In the present exemplary embodiment, each first binding member 6 has three holes 42. Each hole 42 extends in first direction A and overlaps with the plurality of electric power storage devices 14. Output terminals 24 and valve 26 of each electric power storage device 14 are exposed to the outside through each hole 42.

Each second binding member 8 has second main body 44 and a pair of second protrusions 46. Second main body 44 is a rectangular plate-shaped body extending in first direction A. Second main body 44 extends in parallel to third surface 14c or fourth surface 14d of each electric power storage device 14. When viewed in third direction C, the outline of second main body 44 is substantially the same as the outline of the assembly including array body 2 and the pair of end plates 4. The pair of second protrusions 46 protrudes from both ends of second main body 44 in first direction A toward end plate 4, in other words, toward the opposing second binding member 8, and overlaps each end plate 4 in first direction A. The pair of second protrusions 46 opposes each other in first direction A with array body 2 interposed therebetween. Each second protrusion 46 is provided with through holes 48 through which screws 32 are inserted. Although second binding member 8 illustrated in FIGS. 1 and 2 does not have holes 42, this is not a limitation, and holes 42 may also be provided in second binding member 8. In this case, for example, holes 42 are provided in second main body 44.

For example, each first binding member 6 and each second binding member 8 may be configured as a single plate material. The main body and the pair of protrusions can be formed by bending both ends of a metal sheet. In this case, a portion from this bending position to a distal end corresponds to the protrusion, and the remaining part corresponds to the main body. Alternatively, the binding member may be made of a resin as long as predetermined or higher rigidity can be obtained. Furthermore, the main body and the protrusion, which are separated from each other, may be joined to constitute the binding member. Examples of the metal used for each binding member include aluminum, an aluminum alloy, and steel. Examples of the resin used for the binding member include fiber-reinforced plastics (FRP) including carbon fiber-reinforced plastics and glass fiber-reinforced plastics.

Electric power storage module 1 is assembled as follows, for example. That is, array body 2 is formed by alternately arranging the plurality of electric power storage devices 14 and the plurality of separators 16, and array body 2 is interposed between the pair of end plates 4 in first direction A. Array body 2 and the pair of end plates 4 are interposed between the pair of first binding members 6 in second direction B after being interposed between the pair of second binding members 8 in third direction C. Each first binding member 6 is aligned such that through holes 40 overlap screw holes 34 of end plate 4. Each second binding member 8 is aligned such that through holes 48 overlap screw holes 34 of end plate 4. A portion of through holes 40 and through holes 48 overlap each other. In this state, screws 32 are inserted through through holes 40 and 48 and screw holes 34. Specifically, screws 32 are inserted through through holes 40 and 48 and are screwed into screw holes 34. As a result, first protrusion 38 and second protrusion 46 are fastened and fixed to end plate 4.

Each first binding member 6 and second binding member 8 is fastened to the pair of end plates 4 in this manner, thereby binding the plurality of electric power storage devices 14 in first direction A. Therefore, end plate 4, first binding member 6, and second binding member 8 constitute a binding structure of electric power storage devices 14. First protrusion 38 and end plate 4, and second protrusion 46 and end plate 4 may be fixed by welding or the like. A surface of each binding member opposing array body 2 may be covered with an insulating sheet (not illustrated).

As an example, after this positioning is completed, the bus bars are attached to output terminals 24 of each electric power storage device 14 such that output terminals 24 of the plurality of electric power storage devices 14 are electrically connected to each other. For example, the bus bars are fixed to output terminals 24 by welding. Thereafter, the upper surface of array body 2 is covered with a cover member (not illustrated). The cover member prevents condensed water, dust, and the like from coming into contact with output terminals 24, the bus bars, and valve 26. The cover member is made of a resin having an insulating property, for example, and can be fixed to the upper surface of array body 2 by a well-known fixing structure (not illustrated) including screws and a well-known locking mechanism.

Heat conducting member 10 is accommodated in hole 42 of first binding member 6 opposing second surface 14b of each electric power storage device 14, and is in contact with each second surface 14b in a heat-exchangeable manner. Heat conducting member 10 is made of a material having thermal conductivity higher than air. Preferably, heat conducting member 10 has an insulating property. Preferably, heat conducting member 10 has flexibility. As heat conducting member 10, a known resin sheet or the like having good heat transfer property, such as acrylic rubber or silicone rubber, or a known cooling gel can be used.

Cooling plate 12 is a mechanism for cooling the plurality of electric power storage devices 14. Cooling plate 12 is made of a material having high heat transfer property such as aluminum. One example of array body 2 is placed on a main surface of cooling plate 12 with first binding member 6 interposed therebetween in a state where a lower surface faces cooling plate 12. In this state, cooling plate 12 is in contact with heat conducting member 10 in a heat-exchangeable manner. Each electric power storage device 14 is cooled by heat exchange with cooling plate 12 with heat conducting member 10 interposed therebetween. First binding member 6 may also be in contact with cooling plate 12 in a heat-exchangeable manner. In this case, each electric power storage device 14 can exchange heat with cooling plate 12 with heat conducting member 10 and first binding member 6 interposed therebetween. A refrigerant pipe (not illustrated) through which a refrigerant such as water or ethylene glycol flows may be provided in cooling plate 12.

Preferably, heat conducting member 10 is elastically deformed by being interposed between array body 2 and cooling plate 12, and fills a gap between second surface 14b of each electric power storage device 14 and cooling plate 12. Accordingly, the cooling efficiency of each electric power storage device 14 can be enhanced.

Figure 4:
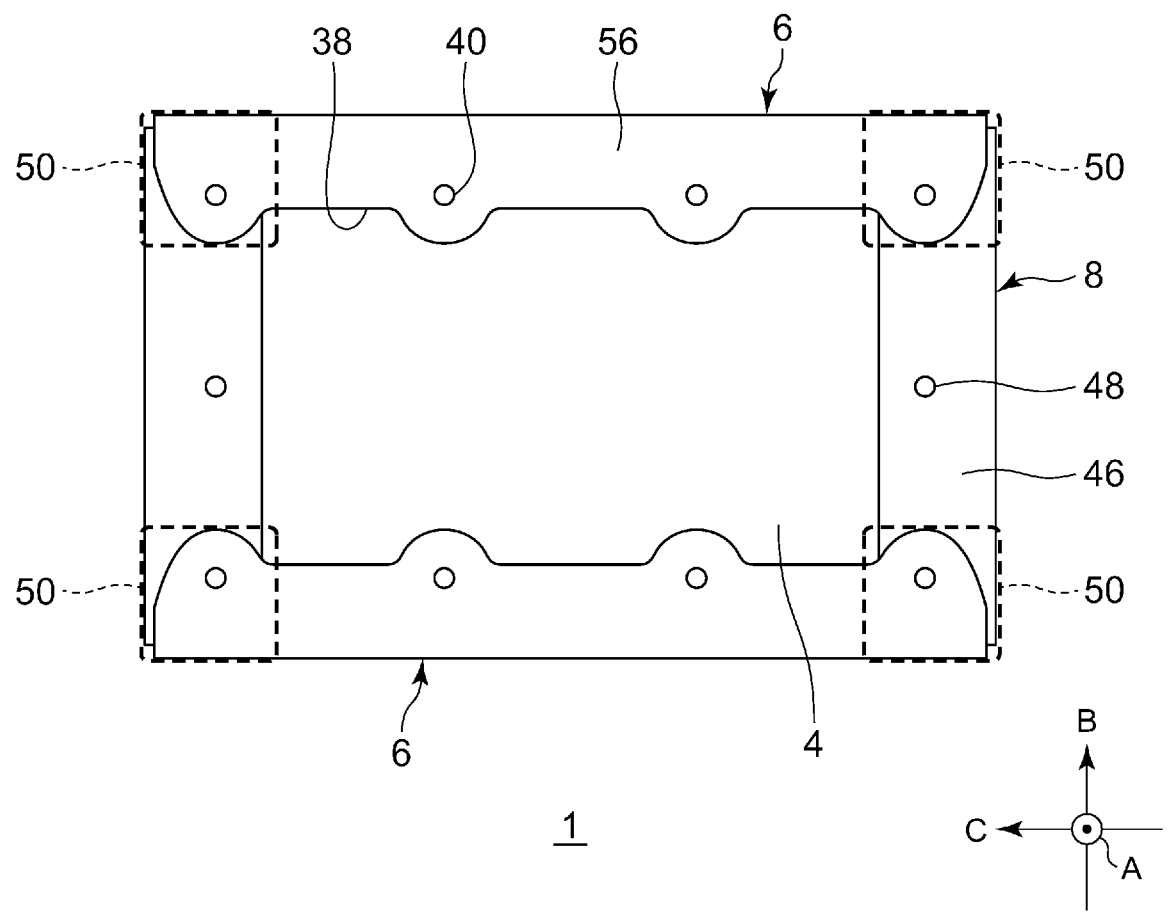
FIG. 4 is a side view of the electric power storage module as viewed in a first direction.
Figure 5A:
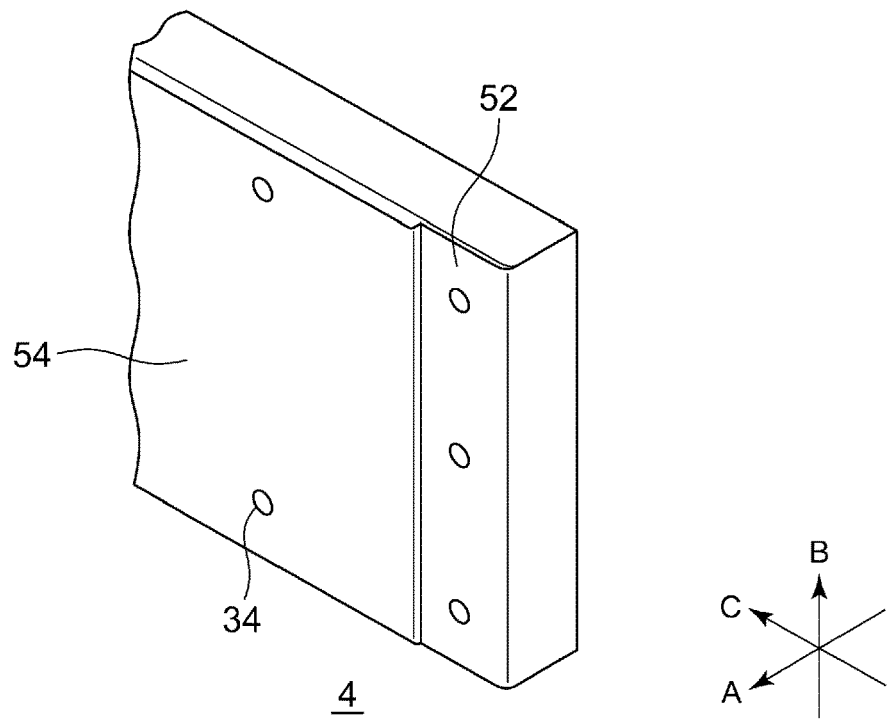
FIG. 5A is a perspective view of a portion of an end plate.
Figure 5B:
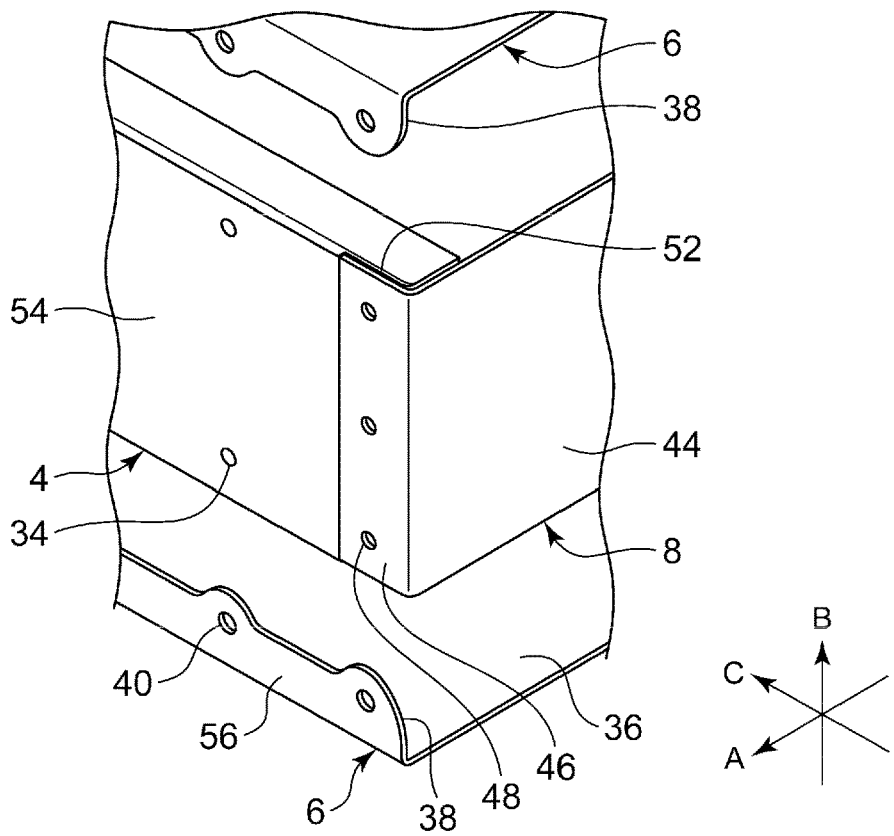
FIG. 5B is a perspective view of respective portions of the end plate, a first binding member, and a second binding member.

Subsequently, a binding structure of electric power storage device 14 will be described in detail. FIG. 4 is a side view of electric power storage module 1 as viewed in first direction A. FIG. 5A is a perspective view of a portion of end plate 4. FIG. 5B is a perspective view of respective portions of end plate 4, first binding member 6, and second binding member 8. Note that illustration of screws 32 is omitted in FIG. 4. Furthermore, illustration of holes 42 is omitted in FIG. 5B.

In a state where first binding members 6 and second binding members 8 are fastened to end plate 4 as illustrated in FIG. 4, at least a portion of each first protrusion 38 and at least a portion of each second protrusion 46 overlap each other in first direction A. Overlapping sections 50 are formed on the main surface of end plate 4 by overlapping first protrusions 38 and second protrusions 46. In the present exemplary embodiment, both ends of each first protrusion 38 in third direction C and both ends of each second protrusion 46 in second direction B overlap each other. Therefore, when viewed in first direction A, overlapping sections 50 are formed at the four corners of end plate 4.

In overlapping section 50, second protrusion 46 is positioned closer to end plate 4 than first protrusion 38 is. That is, in first direction A, second protrusion 46 is positioned inside, and first protrusion 38 is positioned outside. As illustrated in FIGS. 5A and 5B, end plate 4 has recess 52 at a position overlapping second protrusion 46. Recess 52 has a shape recessed in first direction A. Recesses 52 are disposed at both ends in third direction C on main surface 54 facing the side of end plate 4 opposing array body 2. Hereinafter, a region of main surface 54 where recesses 52 are not provided is appropriately referred to as a remainder of main surface 54. Second protrusions 46 are fitted (accommodated) in each recess 52. As a result, the steps between the remainder of main surface 54 and the surfaces (end surfaces in first direction A) of second protrusions 46 become small. That is, in first direction A, the protrusion amount of second protrusions 46 with respect to the remainder of main surface 54 decreases. The depth (size in first direction A) of recesses 52 may be equal to the thickness (size in first direction A) of second protrusions 46. As a result, the remainder of main surface 54 and the surfaces of second protrusions 46 may be flush with each other. That is, the protrusion amount of second protrusions 46 described above may be 0.

Note that recess 52 is not necessarily provided. In a case where recess 52 is not provided, a region of first protrusion 38 other than a region included in overlapping section 50 (i.e., a region not constituting overlapping section 50) may be separated from main surface 54 of end plate 4 due to the thickness of second protrusion 46. In this case, first protrusion 38 may be bent such that the region protrudes toward main surface 54. Alternatively, the region may be thick so as to protrude toward main surface 54. The bottom surface of recess 52 can also be regarded as main surface 54 of end plate 4. In this case, the remainder of main surface 54 in the present exemplary embodiment can be interpreted as a rib (projection) provided on main surface 54. In this interpretation, overlapping section 50 overlaps the region other than the rib of main surface 54. Fastening section 56 described later overlaps the rib and is fastened to the rib.

First protrusion 38 extends from the surface of one second protrusion 46 to the surface of the other second protrusion 46 via the remainder of main surface 54. Since each second protrusion 46 is fitted into recesses 52, first protrusion 38 can be in contact with the remainder of main surface 54 with a smaller gap or without a gap in a state of being in contact with each second protrusion 46.

First protrusion 38 has fastening section 56 directly fastened to end plate 4 in a region other than a region included in overlapping section 50. First protrusion 38 of the present exemplary embodiment has fastening section 56 at a center (region interposed by both end portions) in third direction C. Fastening section 56 overlaps the remainder of main surface 54 without second protrusion 46 interposed therebetween. Fastening section 56 has through holes 40, and the remainder of main surface 54 has screw holes 34. Through holes 40 of fastening section 56 and screw holes 34 of main surface 54 overlap each other, and fastening section 56 is directly fastened to end plate 4 by inserting screws 32. In end plate 4 having no recess 52, second protrusion 46 is in contact with main surface 54 of end plate 4, and fastening section 56 may be separated from main surface 54. In this case, fastening section 56 may be fastened to end plate 4 by interposing a spacer (not illustrated) between fastening section 56 or its periphery and main surface 54.

With respect to a positional relationship between second protrusion 46 and end plate 4 in second direction B, both end portions of second protrusion 46 are positioned closer to the center of electric power storage module 1 in second direction B than both end portions of end plate 4 are. Accordingly, when first binding member 6 is assembled to end plate 4, it is possible to suppress interference of second protrusion 46.

As described above, electric power storage module 1 according to the present exemplary embodiment includes array body 2 in which a plurality of electric power storage devices 14 are arranged in first direction A, a pair of end plates 4 which are disposed at both ends of array body 2 in first direction A and interpose array body 2, and first binding member 6 and second binding member 8 which bind array body 2 in first direction A. First binding member 6 includes first main body 36 extending in first direction A and a pair of first protrusions 38 protruding from both ends of first main body 36 in first direction A toward end plate 4 and fixed to each end plate 4. Second binding member 8 includes second main body 44 extending in first direction A and a pair of second protrusions 46 protruding from both ends of second main body 44 in first direction A toward end plate 4 and fixed to each end plate 4. At least a portion of first protrusion 38 and at least a portion of second protrusion 46 overlap each other in first direction A to form overlapping section 50.

Normally, a protrusion of a binding member is installed so as to be within an extension range of end plate 4. Conversely, in order to address an increase in an expansion amount of electric power storage device 14, it is conceivable to arrange binding members on three or more surfaces of array body 2 and bind array body 2 with a stronger force. It is also conceivable to increase the size of each binding member to increase the binding force of array body 2 held by each binding member. In this case, the protrusions of the binding members approach each other. Therefore, in order to avoid interference between the protrusions, it is necessary to make the size of each protrusion smaller than an allowable size from the viewpoint of the size of end plate 4. However, when the size of the protrusion is reduced, the strength of the protrusion is reduced accordingly, and the strength of the binding structure of electric power storage device 14 may be reduced.

In the present exemplary embodiment by contrast, overlapping of first protrusion 38 and second protrusion 46 is allowed. Therefore, the protrusions can be made larger than a case where the protrusions are designed not to overlap each other. Therefore, the strength of each protrusion can be enhanced and hence the strength of the binding structure of electric power storage device 14 can be enhanced. Furthermore, the thickness of the binding structure can be increased by overlapping the protrusions to form overlapping section 50. This can increase the strength of the binding structure. Thus, it is possible to address an increase in the expansion amount of electric power storage device 14. Furthermore, since the binding structure is given thickness by overlapping each protrusion, it is possible to suppress difficulty in machining the binding member as compared with a case of increasing the thickness of the binding member itself.

Also in the present exemplary embodiment, second protrusion 46 is positioned closer to end plate 4 than first protrusion 38 is in overlapping section 50. End plate 4 has recess 52 that is recessed in first direction A and into which second protrusion 46 is fitted at a position overlapping with second protrusion 46. Accordingly, it is possible to reduce a gap between the remainder of main surface 54 of end plate 4 and first protrusion 38. As a result, the binding force of array body 2 held by first binding member 6 can be further exerted.

First protrusion 38 of the present exemplary embodiment has fastening section 56 directly fastened to end plate 4 in a region other than a region included in overlapping section 50. Fastening section 56 is fastened to end plate 4 with the gap between end plate 4 and first binding member 6 reduced. Thus, first binding member 6 can be more firmly fastened to end plate 4. As a result, the strength of the binding structure of electric power storage device 14 can be further increased.

Each electric power storage device 14 of the present exemplary embodiment has mutually opposite first surface 14a and second surface 14b, and mutually opposite third surface 14c and fourth surface 14d connecting first surface 14a to second surface 14b. Electric power storage module 1 includes a pair of first binding members 6 opposing first surface 14a and second surface 14b, and a pair of second binding members 8 opposing third surface 14c and fourth surface 14d. In this manner, by providing binding members on four surfaces of array body 2, the strength of the binding structure of electric power storage devices 14 can be further increased. Note that only one first binding member 6 or one second binding member 8 may be provided. That is, binding members may be provided on three surfaces of array body 2.

In the present exemplary embodiment, in overlapping section 50, the protrusion (second protrusion 46) of the binding member which covers the short side surfaces (third surface 14c and fourth surface 14d) of electric power storage device 14 is positioned closer to end plate 4 than the protrusion (first protrusion 38) of the binding member which covers the upper surface (first surface 14a) and the lower surface (second surface 14b) of electric power storage device 14. However, this structure is not a limitation, and the protrusion of the binding member which covers the upper surface and the lower surface of electric power storage device 14 may be positioned closer to end plate 4 than the protrusion of the binding member which covers the short side surface of electric power storage device 14. In this case, the short side surfaces of electric power storage device 14 serve as first surface 14a and second surface 14b, the upper surface serves as third surface 14c, the lower surface serves as fourth surface 14d, the pair of binding members opposing each other in third direction C serve as first binding members 6, and the pair of binding members opposing each other in second direction B serve as second binding members 8.

Second Exemplary Embodiment

Figure 6:
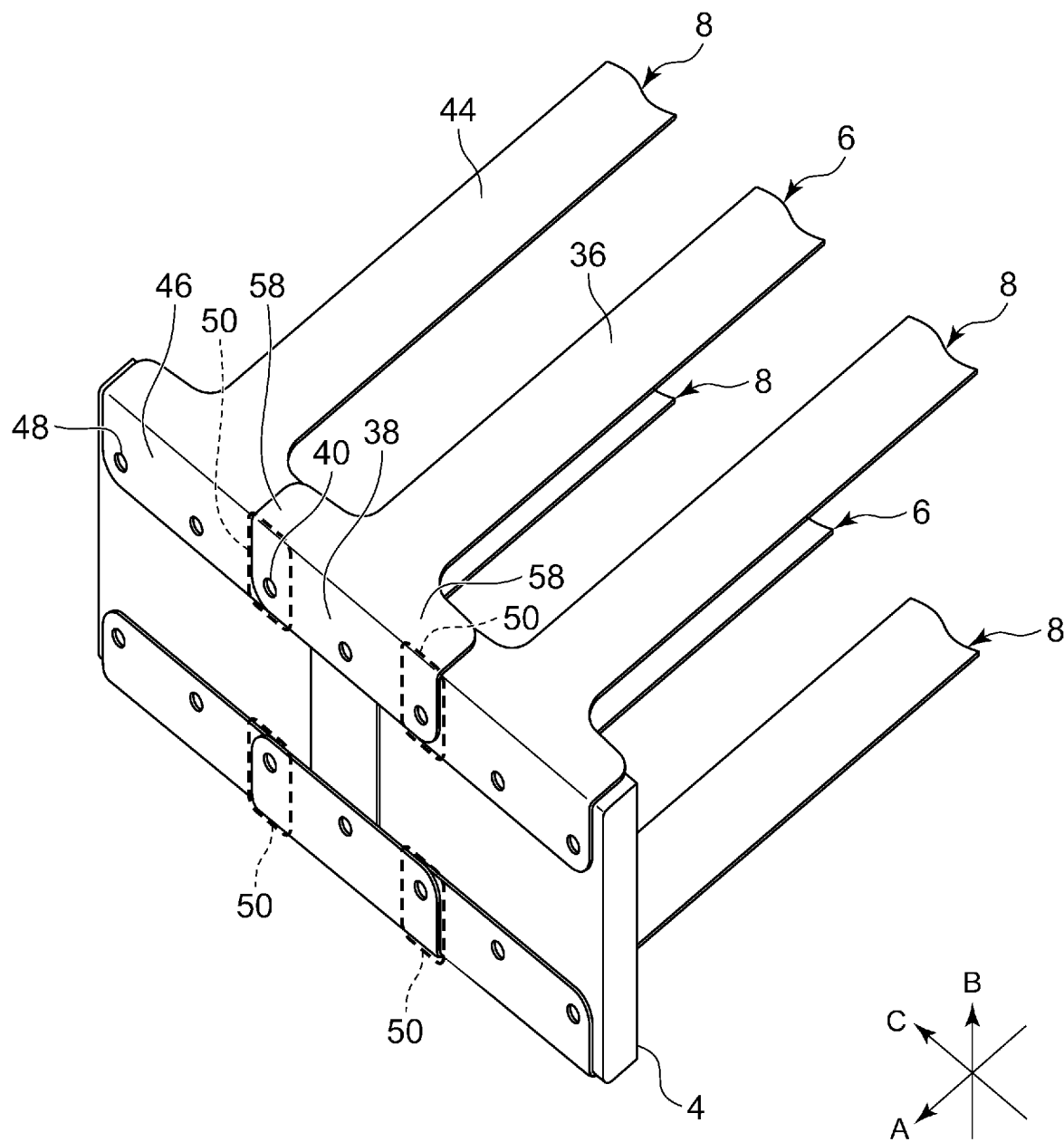
FIG. 6 is a perspective view of an end plate, a first binding member, and a second binding member included in an electric power storage module according to a second exemplary embodiment.
Figure 7:
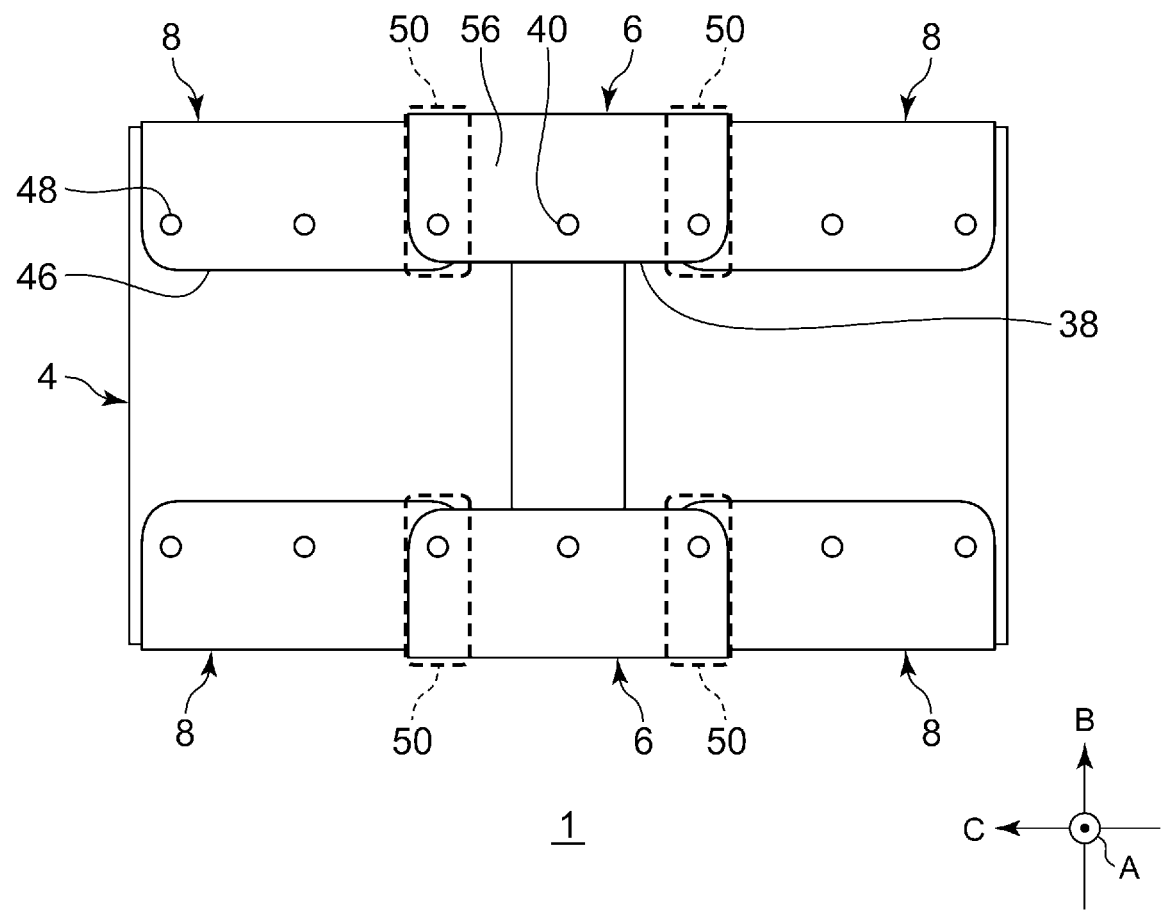
FIG. 7 is a side view of the electric power storage module as viewed in a first direction.
Figure 8A:
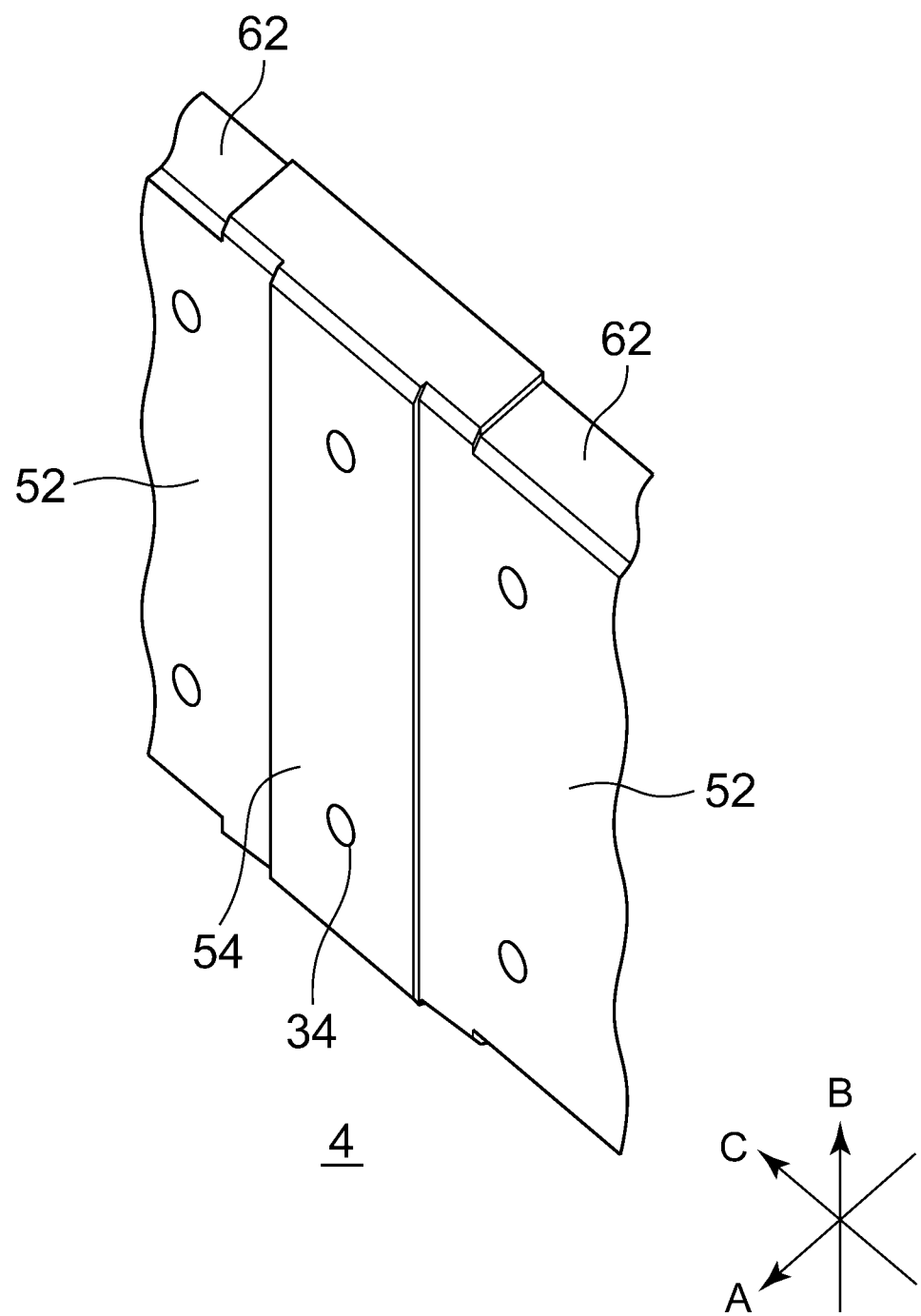
FIG. 8A is a perspective view of a portion of the end plate.
Figure 8B:
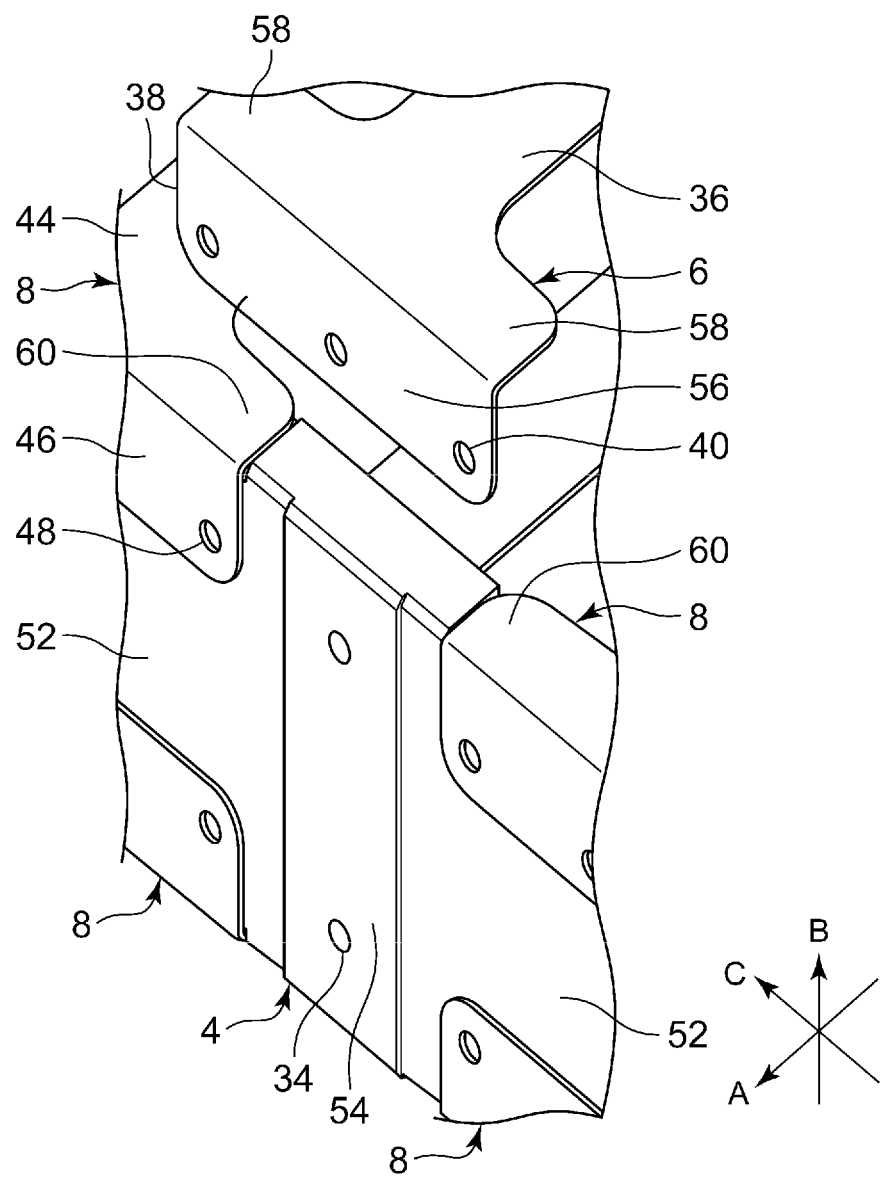
FIG. 8B is a perspective view of respective portions of the end plate, the first binding member, and the second binding member.

A second exemplary embodiment shares a configuration with the first exemplary embodiment except for the binding structure of electric power storage device 14. Hereinafter, the present exemplary embodiment will be described with focus placed on configuration different from that of the first exemplary embodiment, and shared configuration will be briefly described or not described. FIG. 6 is a perspective view of end plate 4, first binding member 6, and second binding member 8 included in electric power storage module 1 according to the second exemplary embodiment. FIG. 7 is a side view of electric power storage module 1 as viewed in first direction A. FIG. 8A is a perspective view of a portion of end plate 4. FIG. 8B is a perspective view of respective portions of end plate 4, first binding member 6, and second binding member 8. In FIG. 6, only one end plate 4 and a portion of each binding member are illustrated.

Electric power storage module 1 according to the present exemplary embodiment includes array body 2 (refer to FIG. 2) in which a plurality of electric power storage devices 14 are arranged in first direction A, a pair of end plates 4 which are disposed at both ends of array body 2 in first direction A and interpose array body 2, and first binding member 6 and second binding member 8 which extend in first direction A and bind array body 2 in first direction A. First binding member 6 includes first main body 36 and a pair of first protrusions 38. Each first protrusion 38 is provided with through holes 40. Second binding member 8 includes second main body 44 and a pair of second protrusions 46. Each second protrusion 46 is provided with through holes 48.

First binding member 6 and second binding member 8 of the present exemplary embodiment are arranged side by side so as to oppose first surface 14a (refer to FIG. 2) of each electric power storage device 14. Furthermore, first binding member 6 and second binding member 8 are arranged side by side so as to oppose second surface 14b (refer to FIG. 2) of each electric power storage device 14. As an example, electric power storage module 1 includes two first binding members 6 and four second binding members 8. One first binding member 6 and two second binding members 8 are arranged on each of the upper surface side and the lower surface side of array body 2. On each surface of array body 2, second binding member 8, first binding member 6, and second binding member 8 are arranged in the stated order in third direction C.

In a state where each first binding member 6 and each second binding member 8 are fastened to end plate 4, at least a portion of each first protrusion 38 and at least a portion of each second protrusion 46 overlap each other in first direction A. Overlapping sections 50 are formed on the main surface of end plate 4 by overlapping first protrusions 38 and second protrusions 46. In the present exemplary embodiment, both ends of each first main body 36 in third direction C and an end of each second protrusion 46 near a first main body 36 overlap each other. Therefore, when viewed in first direction A, two overlapping sections 50 are formed above and below a center part of end plate 4 in third direction C.

In overlapping section 50, second protrusion 46 is positioned closer to end plate 4 than first protrusion 38 is. Furthermore, as illustrated in FIGS. 8A and 8B, end plate 4 has recesses 52 at positions overlapping second protrusion 46. Recess 52 has a shape recessed in first direction A. Recesses 52 are disposed in a region other than the center in third direction C on main surface 54 of end plate 4 facing away from array body 2. Second protrusions 46 are fitted in each recess 52. As a result, the step between the remainder of main surface 54 and the surfaces of second protrusions 46 becomes smaller. The remainder of main surface 54 and the surfaces of second protrusions 46 may be flush with each other. Therefore, first protrusion 38 can not only be in contact with each second protrusion 46, but also be in contact with the remainder of main surface 54 with a smaller gap or without a gap.

When first protrusion 38 between the pair of second protrusions 46 in third direction C is disposed further inside in first direction A than each second protrusion 46, recess 52 may be provided at the center in third direction C. For example, recess 52 is provided at a position overlapping first protrusion 38. As illustrated in FIG. 7, recess 52 need not extend to both ends in third direction C. Further, recess 52 need not extend to the center in second direction B. For example, recess 52 may be provided only in a region overlapping each second protrusion 46.

First protrusion 38 has fastening section 56 directly fastened to end plate 4 in a region other than a region included in overlapping section 50. First protrusion 38 of the present exemplary embodiment has fastening section 56 at the center in third direction C. Fastening section 56 overlaps the remainder of main surface 54 without second protrusion 46 interposed therebetween. By inserting screws 32 through through holes 40 and screw holes 34, fastening section 56 is directly fastened to end plate 4.

In addition, first region 58 which is continuous from overlapping section 50 in first main body 36 and second region 60 which is continuous from overlapping section 50 in second main body 44 overlap each other in second direction B. As a result, the bent portion connecting first protrusion 38 and first main body 36 and the bent portion connecting second main body 44 and second protrusion 46 overlap each other.

As an example, end plate 4 has recesses 62 at positions overlapping second main bodies 44. Recesses 62 are provided on an end surface in second direction B orthogonal to first direction A, and have shapes recessed in second direction B. Second main bodies 44, particularly, second regions 60 of second main bodies 44 are fitted (accommodated) in recesses 62. As a result, the steps between the upper surface or the lower surface of end plate 4 and the surfaces of second main bodies 44 become smaller. The depth (size in second direction B) of recesses 62 may be equal to the thickness (size in second direction B) of second main bodies 44. As a result, the upper surface or the lower surface of end plate 4 and the surfaces of second main bodies 44 may become flush with each other. Recesses 62 may be omitted.

First main body 36 extends from the surface of one second main body 44 to the surface of the other second main body 44 via the upper surface or the lower surface of end plate 4. Since each second main body 44 is fitted into recesses 62, first protrusion 38 also can be in contact with the upper surface or the lower surface of end plate 4 with a smaller gap or without a gap in a state of being in contact with each second main body 44.

In electric power storage module 1 according to the present exemplary embodiment as described above, first binding member 6 and second binding member 8 are arranged side by side so as to oppose first surface 14a of each electric power storage device 14. As such, by arranging the plurality of binding members with respect to one surface of array body 2, it is possible to suppress an increase in size of each binding member even if array body 2 increases in size and the installation surface of the binding members expands. As a result, it is possible to suppress difficulty in machining the binding members.

In addition, in the present exemplary embodiment, first region 58 which is continuous from overlapping section 50 in first main body 36 and second regions 60 which are continuous from overlapping sections 50 in second main bodies 44 overlap each other. As such, the bent portion connecting first protrusion 38 and first main body 36 and the bent portion connecting second main body 44 to second protrusion 46 overlap each other. When electric power storage devices 14 expand, stress tends to concentrate on the bent portions of each binding member. Therefore, each binding member is easily damaged at the bent portion. By contrast, by overlapping the bent portions of each binding member, it is possible to suppress breakage of the bent portions. Thus, the strength of the binding structure of electric power storage devices 14 can be increased.

By forming overlapping section 50, in other words, by allowing first protrusion 38 and second protrusions 46 to overlap each other, a wider range of the edge portion of end plate 4 can be covered with the bent portion of any of the binding members. Accordingly, even when the bent portion of first binding member 6 and the bent portion of second binding member 8 do not overlap each other, the strength of the binding structure can be increased. For example, each protrusion may be larger than each main body in third direction C. That is, each binding member may have a T-shaped end in first direction A. In the present exemplary embodiment, a binding member may be provided at a position opposing a side surface of array body 2.

The exemplary embodiments of the present disclosure have been described in detail above. The above-described exemplary embodiments are merely specific examples for implementing the present disclosure. The contents of the exemplary embodiments do not limit the technical scope of the present disclosure, and many design changes such as changes, additions, and deletions of constituent elements can be made without departing from the spirit of the invention defined in the claims. Any new exemplary embodiment resulting from a change or modification according to the designed concept offers effects of an exemplary embodiment and a modification that are combined with the new exemplary embodiment. In the above-described exemplary embodiments, what can be changed or modified according to the designed concept is emphasized by such phrases as "of the present exemplary embodiment" and "in the present exemplary embodiment". However, contents not expressed by such phrases may also be changed or modified according to the designed concept. Further, any combination of constituent elements included in each exemplary embodiment is also effective as an aspect of the present disclosure. Hatching applied to the cross section in the drawing does not limit the material of the object to which the hatching has been applied.

In each of the above-described exemplary embodiments, the arrangement of first protrusion 38 and second protrusion 46, particularly the positional relationship of first protrusion 38 and second protrusion 46 in first direction A in overlapping section 50 may be the same or different between one end plate 4 side and another end plate 4 side. When the positional relationship between first protrusion 38 and second protrusion 46 is made the same on both sides of the pair of end plates 4, the design of both end portions of electric power storage module 1 in first direction A can be easily made common. However, in this case, a binding member in which the protrusions on both sides are arranged on the inner side tends to be shorter than a binding member in which the protrusions on both sides are arranged on the outer side. That is, two types of binding members having different dimensions may be required. By contrast, when the positional relationship between first protrusion 38 and second protrusion 46 is reversed between one end plate 4 side and another end plate 4 side, the dimensions of first binding member 6 and second binding member 8 in first direction A are easily made common.

REFERENCE MARKS IN THE DRAWINGS 1 electric power storage module
2 array body
4 end plate
6 first binding member
8 second binding member
14 electrical power storage device
36 first main body
38 first protrusion
44 second main body
46 second protrusion
50 overlapping section
52 recess
56 fastening section
58 first region
60 second region

The invention claimed is:

1. An electric power storage module comprising:
an array body including a plurality of electric power storage devices arranged in a first direction;
a pair of end plates disposed at opposite ends of the array body in the first direction to sandwich the array body, each of the pair of end plate having a main surface facing the plurality of electric power storage devices, the main surface extending in a second direction and a third direction, the second direction crossing the first direction and the third direction crossing the first direction and the second direction; and
a first binding member and a second binding member which bind the array body in the first direction, wherein:
the first binding member includes a first member, the first member comprising:
a first main body extending in the first direction and the second direction; and
a pair of first protrusions each protruding from a corresponding one of opposite ends of the first main body toward a corresponding one of the end plates in the third direction and fixed to the corresponding one of the end plates, the opposite ends being ends of the first main body in the first direction,
the second binding member includes a second member, the second member comprising:
a second main body extending in the first direction and the third direction; and
a pair of second protrusions each protruding from a corresponding one of opposite ends of the second main body toward a corresponding one of the end plates in the third direction and fixed to the corresponding one of the end plates, the opposite ends being ends of the second main body in the first direction,
each of the plurality of electric power storage devices includes mutually opposite first surface and second surface, and mutually opposite third surface and fourth surface connecting the first surface to the second surface,
the first surface and the second surface extend in the first direction and the second direction,
the third surface and the fourth surface extend in the first direction and the third direction,
the first main body overlaps the first surface, the second main body overlaps the third surface, and
an overlapping section including at least a portion of the first protrusion and at least a portion of the second protrusion overlapping each other in the first direction.

2. The electric power storage module according to claim 1, wherein
the at least a portion of the first protrusion and the at least a portion of the second protrusion constituting the overlapping section each include a through hole, and
each of the end plates includes a screw hole, and
the through hole of the first protrusion, the through hole of the second protrusion, and the screw hole overlap in the first direction, and a fastening member passes therethrough, to fasten and fix the first binding member, the second binding member, and the end plates.

3. The electric power storage module according to claim 2, wherein
a plurality of through holes are provided to the at least the portion of the first protrusion and the at least the portion of the second protrusion, respectively, and
the plurality of through holes are arranged in the second direction.

4. The electric power storage module according to claim 3, wherein electrodes are provided on the first surface of each of the plurality of electric power storage devices such that the electrodes are exposed through the plurality of through holes.

5. The electric power storage module according to claim 1, wherein
the second protrusion is positioned closer to each of the end plates than the first protrusion is in the overlapping section, and
the each of the end plates includes a recess at a position overlapping the second protrusion, the recess being recessed in the first direction and into which the second protrusion is fitted.

6. The electric power storage module according to claim 1, wherein the first protrusion includes a fastening section fastened to the each of the end plates in a region other than a region included in the overlapping section.

7. The electric power storage module according to claim 1, wherein
the first protrusion includes a fastening section fastened to the each of the end plates in a region other than a region included in the overlapping section, and
the each of the end plates includes a rib on a main surface facing opposite the array body,
the overlapping section overlaps a region of the main surface other than the rib, and
the fastening section overlaps the rib and is fastened to the rib.

8. The electric power storage module according to claim 1, wherein;
the first binding member includes a third member, the third member comprising:
a third main body extending in the first direction and the second direction; and
a pair of third protrusions each protruding from a corresponding one of opposite ends of the third main body toward a corresponding one of the end plates in the third direction and fixed to the corresponding one of the end plates, the opposite ends being ends of the first main body in the first direction,
the second binding member includes a fourth member, the fourth member comprising:
a fourth main body extending in the first direction and the third direction; and
a pair of fourth protrusions each protruding from a corresponding one of opposite ends of the fourth main body toward a corresponding one of the end plates in the third direction and fixed to the corresponding one of the end plates, the opposite ends being ends of the second main body in the first direction,
the third main body overlaps the second surface, and
the fourth main body overlaps the fourth surface.

9. The electric power storage module according to claim 1, wherein
each of the plurality of electric power storage devices includes a first surface extending in parallel to the first direction, and
the first binding member and the second binding member are arranged side by side to oppose the first surface.

10. The electric power storage module according to claim 9, wherein a first region which is continuous from the overlapping section in the first main body and a second region which is continuous from the overlapping section in the second main body overlap each other.

11. The electric power storage module according to claim 10, wherein
the each of the end plates includes a recess on an end surface in a second direction orthogonal to the first direction, and
the second region is accommodated in the recess.

12. The electric power storage module according to claim 1, wherein the first main body includes a plurality of holes.

* * * * *